W. B. HARSEL.
TIRE MACHINE.
APPLICATION FILED JULY 8, 1918.
1,374,449. Patented Apr. 12, 1921.
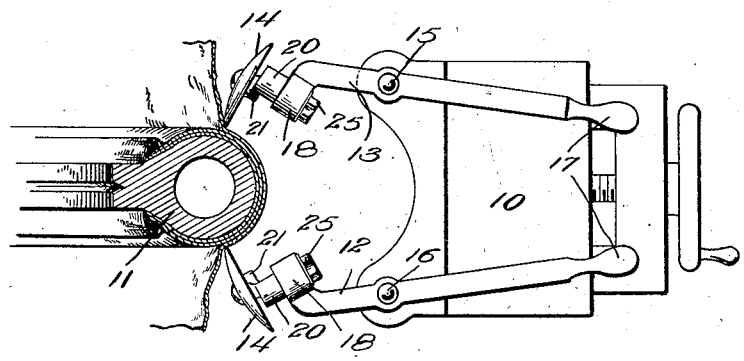
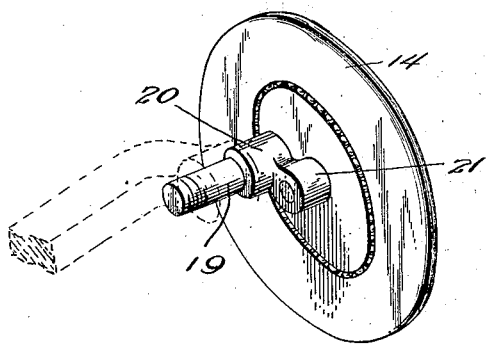
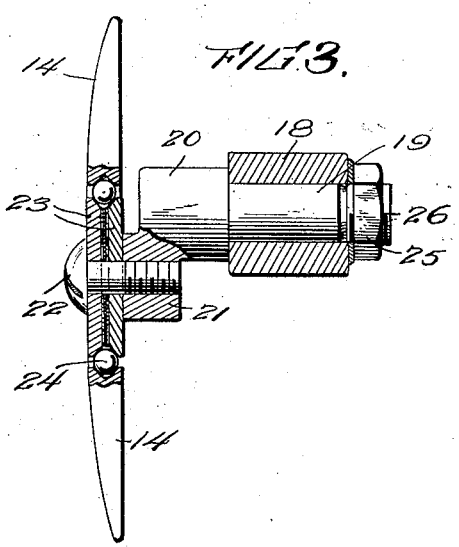
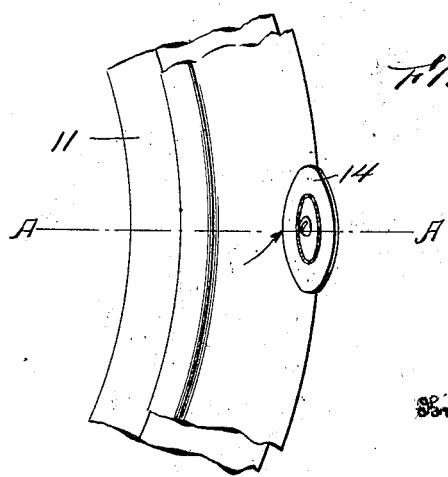
Inventor
WILLIAM B. HARSEL
By C. S. Landon
his Attorney

UNITED STATES PATENT OFFICE.

WILLIAM B. HARSEL, OF AKRON, OHIO, ASSIGNOR TO GOODYEAR TIRE & RUBBER COMPANY, OF AKRON, OHIO, A CORPORATION OF OHIO.

TIRE-MACHINE.

1,374,449.

Specification of Letters Patent.

Patented Apr. 12, 1921.

Application filed July 8, 1918. Serial No. 243,924.

*To all whom it may concern:*

Be it known that I, WILLIAM B. HARSEL, a citizen of the United States, residing at Akron, in the county of Summit and State of Ohio, have invented new and useful Improvements in Tire-Machines, of which the following is a specification.

My present invention relates to new and useful improvements in stitchers for tire carcass making machines, and has for its principal object the provision of an immediate mounting for the stitcher disk itself, which is of such a nature that the stitcher disks, (of which two are usually employed on a tire making machine, there being one disk on each side of the core on which the tire carcass is formed), may be quickly and independently adjusted by manipulation of their immediate mounting and without any manipulation of the pivotal arm mounting or any other portion of the stitcher carriage, for the purpose of varying the angular relation with the threads or cords composing the fabric at their point of contact therewith.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawing, wherein there has been illustrated a preferred embodiment of the invention as it is reduced to practice, and throughout the several views of which, similar reference numbers designate corresponding parts:

Figure 1 is a top plan view of the stitcher carriage showing the stitcher disks mounted upon my improved support and indicating in horizontal section the core upon which the stitcher disks are adapted to operate;

Fig. 2 is a detailed perspective view of the stitcher disk mounting;

Fig. 3 is a vertical section through one of the stitcher disks, its mounting shank and the bearing casting; and Fig. 4 is a diagrammatic view of the relationship of the stitcher to the core.

As is well known, it is customary in the tire machine art to mount the stitcher disks, (of the type which are adapted to move progressively inwardly and radially along the sides of the core during the laying down and forming of the fabric ply), upon pivotal supports, which pivots are mounted on a so-called stitcher carriage, and which supports are operated either manually or by mechanical means to swing the stitcher disks, during the forming of the fabric plies, around the core, whereby the disks may be caused to follow the curving sides of the core and thereby form the fabric thereto and arrange the threads of the fabric in the proper positions.

In the drawing I have illustrated my proposed improvement in stitcher mountings in connection with a tire core and a stitcher carriage. The stitcher carriage 10, (which is only conventionally shown, since its specific construction forms no part of this invention), will, of course, be mounted in the usual manner for sliding movement with respect to the core 11 and will be provided with suitable means (not shown) whereby the sliding may be controlled. As illustrated conventionally at 12 and 13, there is mounted upon the carriage 10 a pair of pivoted arms, on the forward ends of which are mounted the stitcher disks 14. The arms 12 and 13 are, of course, adapted to swing about their pivots 15 and 16 to permit the stitcher disks 14 to be engaged with the core or withdrawn therefrom as may be desired. The arms 12 and 13 may be provided with handles as at 17 to admit of the manual manipulation of the stitcher disks or may be, without affecting at all the scope of this present invention, equipped with mechanical means of either automatic or semi-automatic type for control of the stitcher disks. The forward ends of the arms 12 and 13 are provided with suitable members such as the sleeves 18 for reception of the mounting shank by which the stitcher disks 14 are immediately supported.

Fig. 2 of the drawings illustrates a perspective view of one of the stitcher disks 14 and its mounting shank, which consists of a stem 19 and an enlarged end portion 20, having an offset crank or eccentric portion 21 formed integrally thereon.

This offset crank or eccentric portion 21 is to be provided with a stub axle of some character to which the disk may be revolubly supported. In the present embodiment of the invention I have shown this stub axle as comprising a cap screw 22, which is threaded into the crank 21 as illustrated in detail in Fig. 3. The cap screw passes through the center of the mating plates or disks 23, which forms complementally a peripheral ball bearing groove wherein are received a series of ball bearings 24. The stitcher disk has a large central opening which accommodates the plates 23 and has on its inner periphery a groove to receive the ball bearings 24, whereby the stitcher disk is supported upon the plates 23 for free rotation.

It will, of course, be apparent upon inspection of Fig. 3 that the stitcher disk is mounted to revolve about the cap screw 22 or equivalent member as a center, and since these centers project from the crank portion 21, then the stitcher disk therefore revolves about the center which is offset with respect to the stem 19.

When the stitcher disk is to be attached to the arm the stem 19 is passed through the sleeve 18 and is locked against withdrawal therefrom by a nut 25 threaded upon the reduced threaded portion 26 of the stem 19. It will, of course, be understood that instead of the reduced threaded extension 26 and the nut 25 a cap screw may be substituted as a means for holding the stem 19 against withdrawal from the sleeve.

The stem 19, being inserted in the sleeve 18, is turned until the stitcher disk has been accurately adjusted to locate the point of contact of the disk with the core at the exact horizontal center line of the core. This adjustment will be appreciated upon reference to Fig. 4, wherein will be seen that the point of contact of the periphery of the stitcher disk with the core is located on a horizontal line which passes through the axis of rotation of the core, such line being designated A—A in Fig. 4.

From the foregoing description, taken in connection with the accompanying drawings, it will now be appreciated that if, because of inaccuracies in dimensions occurring in the construction of the tire machine, or because of wearing of the parts in service, the stitcher disks are not located to cause their point of contact with the core to lie in the exact horizontal center line of the core, then the mounting which I have provided for the stitchers may be very readily adjusted to bring this condition about.

It should be understood that my present invention concerns only the immediate supporting means for the stitcher disks and is not concerned with the specific construction of the carriage or the means provided for actuating the carriage in its advance and return with respect to the core nor with the particular form of construction or mounting of the stitcher disk supporting arms or equivalent members 12 and 13. This invention does consist, however, solely in the means by which the stitcher disks are immediately supported and by which they may be adjusted in the manner previously described and now to be pointed out in the appended claims.

What I claim is:

1. A stitcher mounting comprising a support, a member journaled in said support, an offset portion upon said journaled member, and a stitcher mounted for free rotation upon said offset portion and adjustable in a vertical plane concentrically about said journaled portion.

2. A stitcher mounting comprising a support, a member journaled in said support, an offset portion upon said journaled member, a stitcher mounted for free rotation upon said offset portion and adjustable in a vertical plane above said journaled portion and means for retaining said stitcher in its adjusted position.

3. In an apparatus of the character described, a journaled support, axial means adjustably mounted in said support and having a crank arm at one extremity thereof, and a stitcher rotatably carried by said crank arm and in a plane at right angles to said axial means.

4. A stitcher mounting comprising a support, a stem arranged upon the support, an offset crank portion on the stem, and a stitcher mounted on the crank portion.

5. A tirebuilding machine including a core, a stitcher-carriage, a stitcher-supporting arm disposed on the carriage, a stitcher-sustaining member mounted on said arm, a stitcher on the member, and means for effecting movement of the stitcher toward and away from the core in a radial direction by rotative movement of the stitcher-sustaining member upon the arm to adjust said stitcher relative to the horizontal center of the core.

6. A tire-building machine including a core, a stitcher-carriage, a stitcher-supporting arm disposed on said carriage, a stitcher-sustaining member mounted on said arm, a stitcher, means for effecting movement of the stitcher toward and away from the core in a radial direction by rotative movement of the stitcher-sustaining member upon the arm, said means comprising a crank-arm mounted upon said stitcher supporting arm, the stitcher being mounted on said crank-arm, and means for locking the supporting member in any of a plurality of positions on said stitcher-supporting arm.

7. A tire-building machine including a core, a stitcher-carriage, a stitcher-carrying arm mounted thereon, a stitcher-support mounted on said arm, a stitcher on the support, and means for effecting a radial adjustment between the stitcher and the core by a rotative movement of the stitcher-support to adjust the stitcher relative to the horizontal center of said core.

8. A stitcher mounting including a supporting-arm, an angulated fixed bearing at its end, an offset element disposed in the bearing and rotatable therein, and a stitcher sustained by said element.

9. A stitcher-mounting including a swinging supporting-arm, an angulated fixed bearing at its end, an offset element disposed in the bearing and rotatable therein, and a stitcher sustained by said element.

10. A stitcher mounting including a supporting-arm provided with an offset bearing-end, an eccentric element adjustable on its axis therein, a stitcher carried upon said eccentric element, and a ball-bearing between the element and the stitcher.

11. A stitcher structure including a horizontal supporting-arm, a crank-element carried thereby and adjustable vertically therein into different planes with respect to the horizontal supporting arm, and a stitcher mounted on the crank-element for free rotation thereon.

In witness whereof, I have hereunto signed my name in the presence of two subscribing witnesses.

WILLIAM B. HARSEL.

Witnesses:
B. J. McDanel,
R. S. Trogner.